United States Patent
Shimizu

(10) Patent No.: US 8,600,623 B2
(45) Date of Patent: Dec. 3, 2013

(54) CONTROL APPARATUS

(75) Inventor: Takashi Shimizu, Gamagori (JP)

(73) Assignee: Denso Corporation, Kariya (JP)

( * ) Notice: Subject to any disclaimer, the term of this patent is extended or adjusted under 35 U.S.C. 154(b) by 274 days.

(21) Appl. No.: 13/292,413

(22) Filed: Nov. 9, 2011

(65) Prior Publication Data

US 2012/0123634 A1    May 17, 2012

(30) Foreign Application Priority Data

Nov. 12, 2010 (JP) ................................. 2010-253597

(51) Int. Cl.
*G05D 1/00* (2006.01)

(52) U.S. Cl.
USPC .......... 701/45; 701/301; 340/425.5; 340/436; 340/988; 455/404.1; 455/404.2

(58) Field of Classification Search
USPC ......... 701/45, 301; 340/425.5, 436, 636, 988; 455/404.1, 404.2
See application file for complete search history.

(56) References Cited

U.S. PATENT DOCUMENTS

| | | | |
|---|---|---|---|
| 6,617,979 B2 * | 9/2003 | Yoshioka | 340/901 |
| 6,661,116 B1 | 12/2003 | Seto | |
| 6,711,399 B1 * | 3/2004 | Granier | 455/404.1 |
| 6,771,166 B2 * | 8/2004 | Mastenbrook | 340/425.5 |
| 7,657,374 B2 * | 2/2010 | Kamiya | 701/301 |
| 7,864,028 B2 * | 1/2011 | Sakai et al. | 340/425.5 |
| 7,868,742 B2 * | 1/2011 | Shimizu | 340/309.16 |
| 8,344,913 B2 * | 1/2013 | Rieth et al. | 340/989 |
| 8,457,283 B2 * | 6/2013 | Stahlin et al. | 379/39 |
| 2002/0075166 A1 | 6/2002 | Yoshioka | |
| 2003/0112133 A1 * | 6/2003 | Webb et al. | 340/436 |
| 2005/0064861 A1 * | 3/2005 | Nishida | 455/420 |
| 2008/0204262 A1 | 8/2008 | Shimizu | |
| 2009/0209225 A1 * | 8/2009 | Sakai et al. | 455/404.1 |
| 2010/0238052 A1 | 9/2010 | Ito et al. | |
| 2011/0096912 A1 * | 4/2011 | Stahlin et al. | 379/39 |

FOREIGN PATENT DOCUMENTS

| | | |
|---|---|---|
| JP | 5-264583 | 10/1993 |
| JP | 2002-117473 | 4/2002 |
| JP | 2007-226588 | 9/2007 |

OTHER PUBLICATIONS

Office Action dated Oct. 2, 2012 in corresponding Japanese Application No. 2010-253597 with English translation.

* cited by examiner

*Primary Examiner* — James Trammell
*Assistant Examiner* — Truc M Do
(74) *Attorney, Agent, or Firm* — Harness, Dickey & Pierce, PLC

(57) ABSTRACT

A control apparatus for vehicles including a first vehicle compatible with an airbag-linked emergency and a second vehicle incompatible with the airbag-linked emergency is provided. The control apparatus includes: a receiver section for receiving an airbag signal from an airbag apparatus; an abnormality determination section for determining that the airbag apparatus is abnormal when the receiver section does not receive the airbag signal from the airbag apparatus; and a control section for activating the abnormality determination section when the control apparatus is mounted to the first vehicle, and for deactivating the abnormality determination section when the control apparatus is mounted to the second vehicle.

4 Claims, 6 Drawing Sheets

CONTROL APPARATUS

CROSS REFERENCE TO RELATED APPLICATION

The present application is based on and claims priority to Japanese Patent Application No. 2010-253597 filed on Nov. 12, 2010, disclosure of which is incorporated herein by reference.

TECHNICAL FIELD

The present disclosure relates to a control apparatus.

BACKGROUND

A system for making an emergency call to a service center in the event of a vehicle accident or the like has been put to practical use. For example, JP 4442619B corresponding to U.S. 2008/0204262A proposes a technique relating to this system. When an auxiliary battery is replaced after completion of an emergency call operation, the technique avoids wasting a battery capacity after the replacement.

As an emergency call system in a vehicle, there is a system that automatically makes an emergency call to a service center in conjunction with deployment of an airbag. This automatic emergency call is also referred to hereinafter as an airbag-linked emergency call. Presently commercially available vehicles include a vehicle compatible with the airbag-linked emergency call and a vehicle incompatible with the airbag-linked emergency call. In a typical airbag system compatible with the airbag-linked emergency call, a communication unit may be provided with a diagnosis function (malfunction diagnosis). For example, an airbag apparatus continuously outputs a signal (airbag signal) during non-deployment of the airbag. When this signal is interrupted, the communication unit determines the airbag is malfunctioned.

Now, let us assume a case where an in-vehicle communication apparatus compatible with the airbag-linked emergency call is mounted to a vehicle incompatible with the airbag-linked emergency call. In this case, since an airbag system is originally designed not to output the airbag signal, the airbag signal is not outputted as a matter of course, and thus, the airbag is wrongly diagnosed as being malfunctioned. Therefore, as to the in-vehicle communication apparatus of an emergency notification call, different in-vehicle communication apparatus products have been mounted to vehicles depending on whether a vehicle is compatible or incompatible with the airbag-linked emergency call. Therefore, an in-vehicle communication apparatus mountable to both of vehicles compatible and incompatible with the airbag-linked emergency call is desired.

SUMMARY

In view of the foregoing, it is an objective of the present disclosure to provide a control apparatus that can be mounted to both of a vehicle compatible with an airbag-linked emergency call and another vehicle incompatible with the airbag-linked emergency call, and that can appropriately control execution of airbag diagnosis by determining whether an airbag malfunction diagnosis operation should be performed.

According to an aspect of the present disclosure, a control apparatus for vehicles including a first vehicle and a second vehicle each equipped with an airbag apparatus is provided. A transmission section for transmitting an airbag signal from the airbag apparatus during non-deployment of the airbag apparatus is equipped in the first vehicle and is not equipped in the second vehicle. The control apparatus includes: a receiver section for receiving a signal transmitted from the airbag apparatus; an abnormality determination section for determining that the airbag apparatus is abnormal when the receiver section does not receive the signal transmitted from the airbag apparatus; and a control section for activating the abnormality determination section when the control apparatus is mounted to the first vehicle, and for deactivating the abnormality determination section when the control apparatus is mounted to the second vehicle.

According to the above configuration, the above control apparatus can be mounted to both of a vehicle compatible with an airbag-linked emergency call and another vehicle incompatible with the airbag-linked emergency call, and can appropriately control execution of airbag diagnosis by determining whether an airbag malfunction diagnosis operation should be performed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
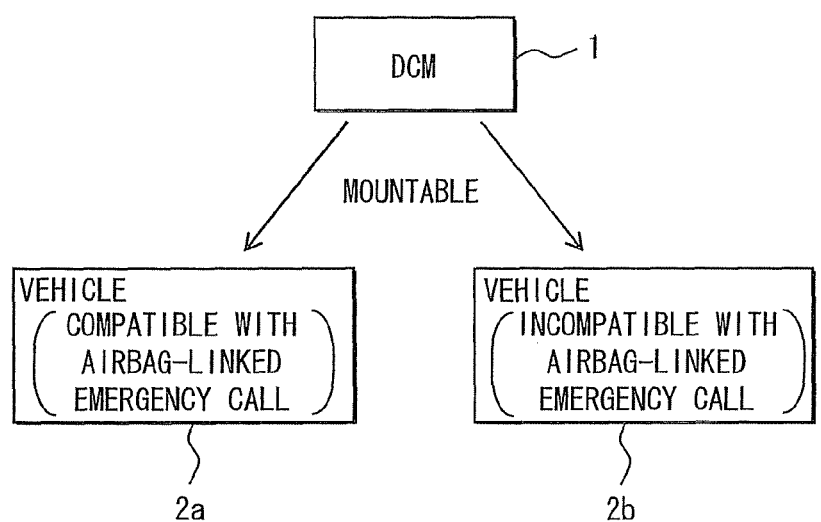
FIG. 1 is a diagram illustrating a data communication module for vehicles in accordance with one embodiment.
Figure 2:
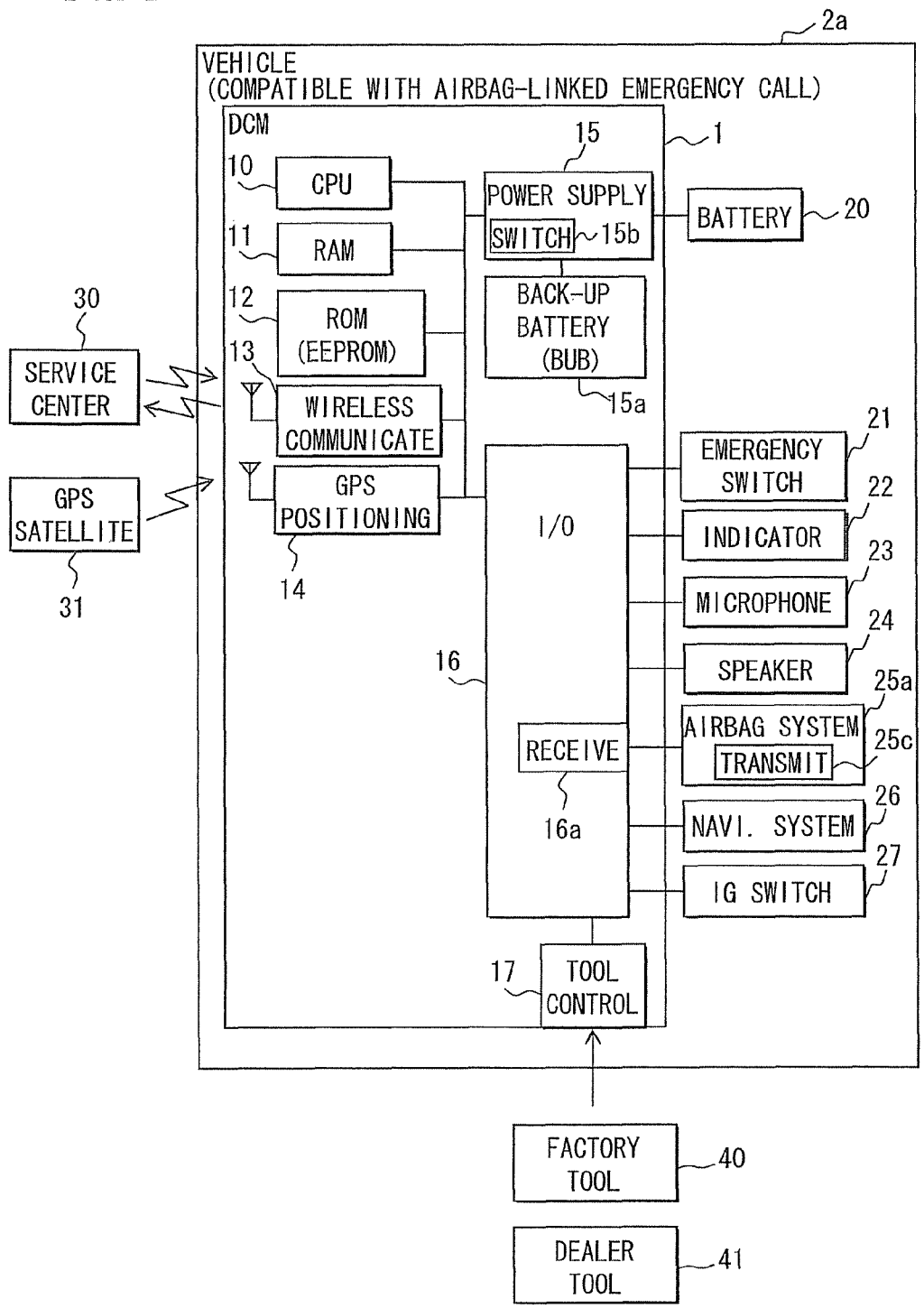
FIG. 2 is a diagram illustrating a configuration of a data communication module when the data communication module is mounted to a vehicle compatible with an airbag-linked emergency call.
Figure 3:
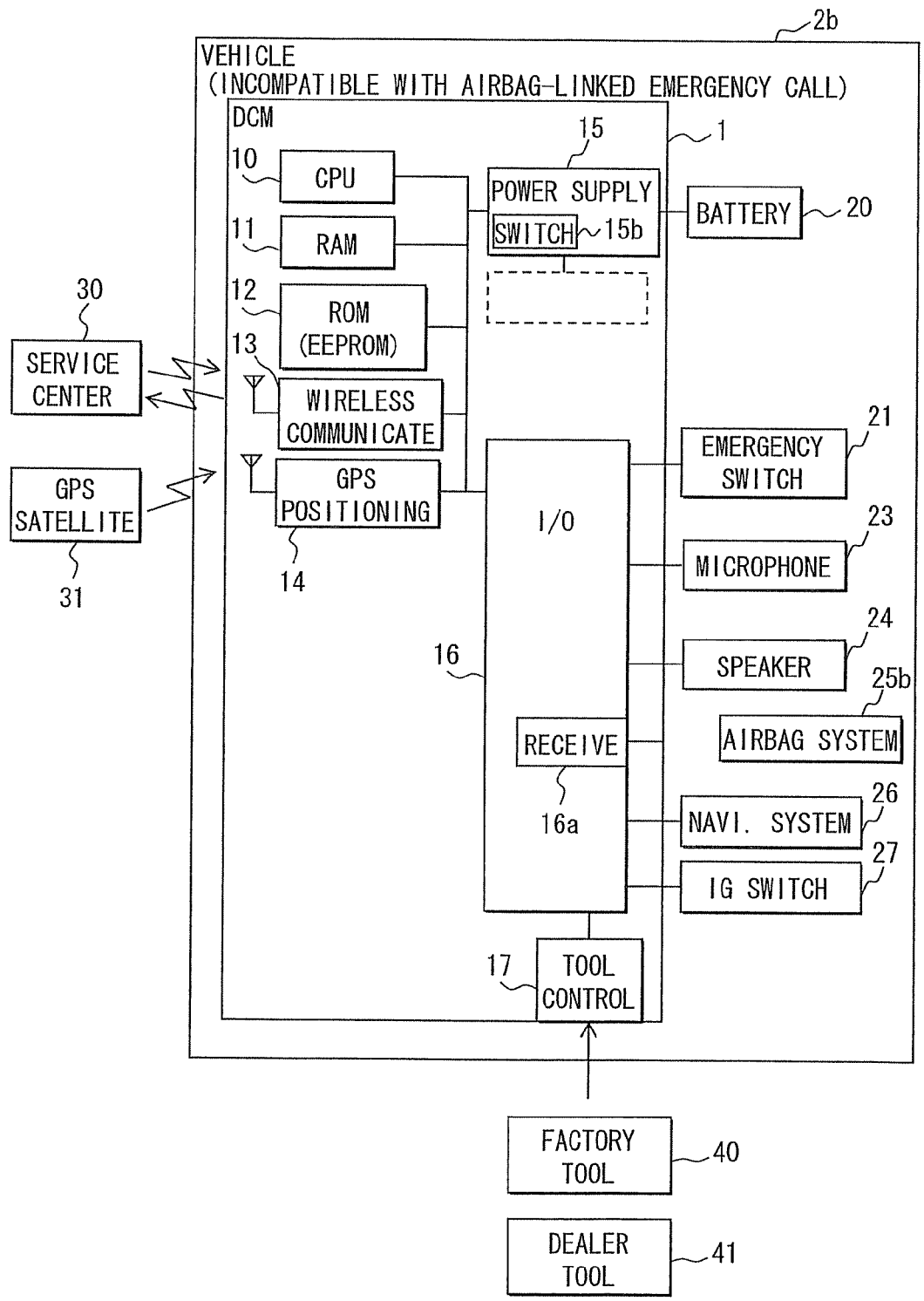
FIG. 3 is a diagram illustrating a configuration of a data communication module when the data communication module is mounted to a vehicle incompatible with the airbag-linked emergency call.

Embodiment will be described with reference to drawings. FIGS. 1, 2 and 3 are diagrams illustrating a configuration of a data communication module 1 (abbreviated as DCM 1) of one embodiment. The data communication module 1 is also called a control apparatus.

As shown in FIG. 1, the DCM 1 is mountable to both of a vehicle 2a compatible with the airbag-linked emergency call and a vehicle 2b incompatible with the airbag-linked emergency call. The vehicle 2a is also referred to hereinafter as a compatible vehicle and a first vehicle. The vehicle 2b is also referred to herein as an incompatible vehicle and a second vehicle. FIG. 2 illustrates the DCM 1 mounted to the compatible vehicle 2a. FIG. 3 illustrates the DCM 1 mounted to the incompatible vehicle 2b.

First, FIG. 2 will be explained. The DCM 1 includes a CPU 10, a RAM 11, a ROM 12, a wireless communication device 13, a GPS positioning device 14, a power supply device 15, an input output (I/O) circuit 16, and a tool controller 17.

The CPU10 performs a variety of information processing such calculating, issuing instructions, and the like. The RAM 11 includes a temporary storage serving as a working area of the CPU 10. The ROM12 includes a non-volatile storage storing programs and the like. The ROM12 may include an electrically erasable programmable read-only memory (EEPROM), memory content of which is rewritable.

The wireless communication device 13 is provided to perform communications for emergency call. The wireless communication device 13 may be basically provided with similar equipment as a cellular phone is. As described later, in an emergency, the wireless communication device 13 make a call to a service center 30. To make a call to the service center 30, the wireless communication device 13 may use an existing wireless communication network, such as communication line and telephone line, in a similar manner as the cellular phone does.

The GPS positioning device 14 receives signals from multiple GPS satellites 31 and calculates a present position (e.g., latitude, longitude) of the vehicle by triangulation or the like. To do so, the GPS positioning device 14 may employ a method of an existing navigation system. The power supply device 15 controls power supply to the DCM 1. A back-up battery 15a is interchangeably (detachably) mounted to the power supply device 15. The back-up battery 15a is abbreviated herein as a BUB or as a battery.

The power supply device 15 includes a switch 15b. As described later, the switch 15b switches a power supply source, which supplies electric power to the DCM 1, between an in-vehicle battery 20 and the BUB 15a. The in-vehicle battery 20 is equipped in the vehicle for driving a starter or the like. The power supply device 15 has a function to determine whether the BUB 15a is attached, by checking a voltage or current.

By using the I/O circuit 16, the DCM 1 can perform communications, such as information transmission and reception, with a variety of equipment of the vehicle. Tools such as a factory tool 40, a dealer tool 41 and the like are connectable to the tool controller 17 to perform a diagnosis (malfunction diagnosis) operation. This will be described later. A receiver device 16a receives a signal transmitted from an airbag system 25a.

The compatible vehicle 2a is equipped with the in-vehicle battery 20, an emergency call switch 21, an indicator 22, a microphone 23, speaker 24, an airbag system 25a, a navigation system 26, and an ignition (IG) switch 27.

The in-vehicle battery 20 supplies electric power for, for example, driving the starter at a time of starting an engine. The emergency call switch 21 is provided to receive an input of an emergency call instruction from a user. The emergency call switch 21 may include, for example, a button placed within reach of a driver in a vehicle compartment. When the user presses down the emergency call switch 21 in an emergency, the CPU 10 instructs the wireless communication device 13 to make the emergency call to the service center 30.

The indicator 22 includes, for example, a red light-emitting diode (LED) or the like. When there is a possibility that the airbag system 25a is malfunctioned, the indicator 22 emits light, thereby notifying the possibility of malfunction to a driver or passenger. A manner of detecting the malfunction of the airbag will be described later. The indicator 22 may be provided by another display device of the vehicle. The microphone 23 and the speaker 24 are provided to enable an occupant to speak with an operator of the service center 30 in the case of the emergency call to the service center 30.

The airbag system 25a, 25b inflates (deploys) an airbag between, for example, a steering wheel and a driver to absorb an impact on the driver at a time of collision of the vehicle 2a, 2b. The airbag system 25a includes a transmission device 25c, which outputs an airbag deployment signal to the DCM when the airbag is deployed. The transmission device 25c of the airbag system 25a outputs an airbag signal during non-deployment of the airbag.

Figure 7:
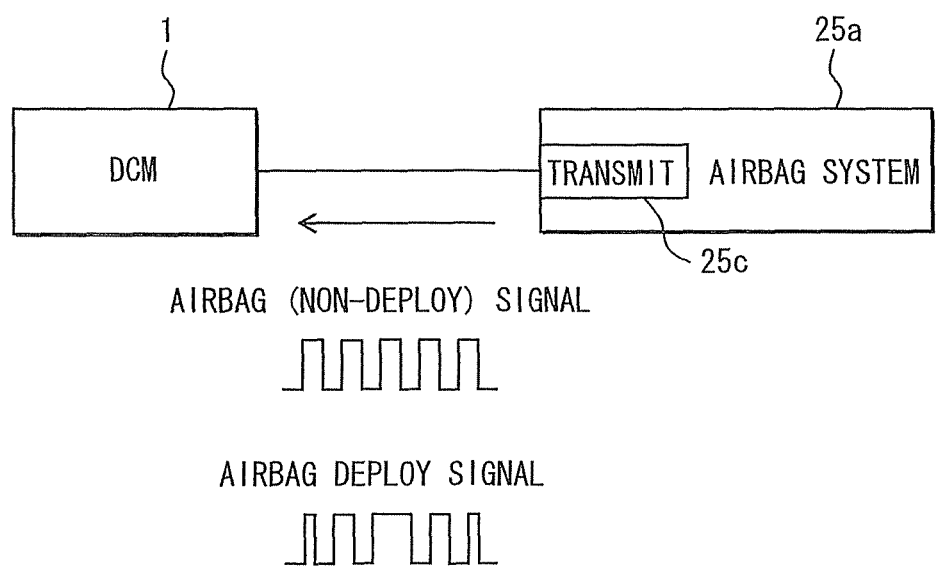
FIG. 7 is a diagram illustrating examples of an airbag signal and an airbag deployment signal.

Examples of the airbag signal and the airbag deployment signal are illustrated in FIG. 7. As shown in FIG. 7, since the airbag signal and the airbag deployment signal are different signals, the DCM 1 can detect whether the airbag is deployed. In addition, as described later, malfunction (abnormality) of the airbag system 25a can be determined from existence or non-existence of reception of the airbag signal.

The navigation system 26 includes a receiver for receiving GPS signals from GPS satellites, a storage storing map information, a display device, and the like. For example, the navigation system 26 calculates position of the vehicle from the received GPS signal, matches the position of the vehicle with the map information, and displays a pointer or a mark indicating the prevent position on a map on the display device. When a user conducts an ON operation of the ignition switch 27, an engine (driving unit) of the vehicle 2a is driven.

Next, FIG. 3 will be explained. As described above, FIG. 3 illustrates a case where the DCM1 is mounted to the incompatible vehicle 2b. Between FIG. 2 and FIG. 3, like references are used to refer to like parts. Explanation on like parts may be omitted.

An airbag system 25b equipped in the incompatible vehicle 2b is not compatible with the airbag-linked emergency call, and dose not have the transmission device, which outputs the airbag signal and the airbag deployment signal illustrated in FIG. 7. The airbag system 25b is not electrically connected to the DCM 1. Moreover, when the DCM 1 is mounted to the incompatible vehicle 2b, the back-up battery 15a is not attached to the power supply device15 of the DCM 1. The indicator 22 illustrated in FIG. 2 may not be equipped in the incompatible vehicle 2b.

In the compatible vehicle 2a, the DCM 1 can make an emergency call in two manners. The emergency call in the first manner is an emergency call linked with the deployment of the airbag. Specifically, when the airbag is deployed due to vehicle collision or the like, the DCM 1 automatically makes the emergency call from the wireless communication device 13 to the service center 30. The emergency call in the second manner is an emergency call that is made in response to the use of the emergency call switch 21 by a user. Specifically, when the occupant instructs the emergency call by using the emergency call switch 21 in an emergency, the DCM 1 makes a call from the wireless communication device 13 to the service center 30. By contrast, in the incompatible vehicle 2b, the DCM 1 makes the emergency call in only the second manner, which is the emergency call made when the emergency call switch 21 is used by the occupant.

As described above, the same DCM 1 (a single product number) is mountable to both of the compatible vehicle 2a and the incompatible vehicle 2b. By performing processes illustrated in FIG. 4, the DCM 1 determines whether the vehicle, to which the DCM 1 is mounted, is the compatible vehicle or the incompatible vehicle. In the following, processes illustrated in FIG. 4 will be described. Procedures of processes of FIGS. 4, 5, 6 may be previously programmed and stored in, for example, the ROM 12. The CPU 10 may automatically execute the programmed procedures.

Figure 4:
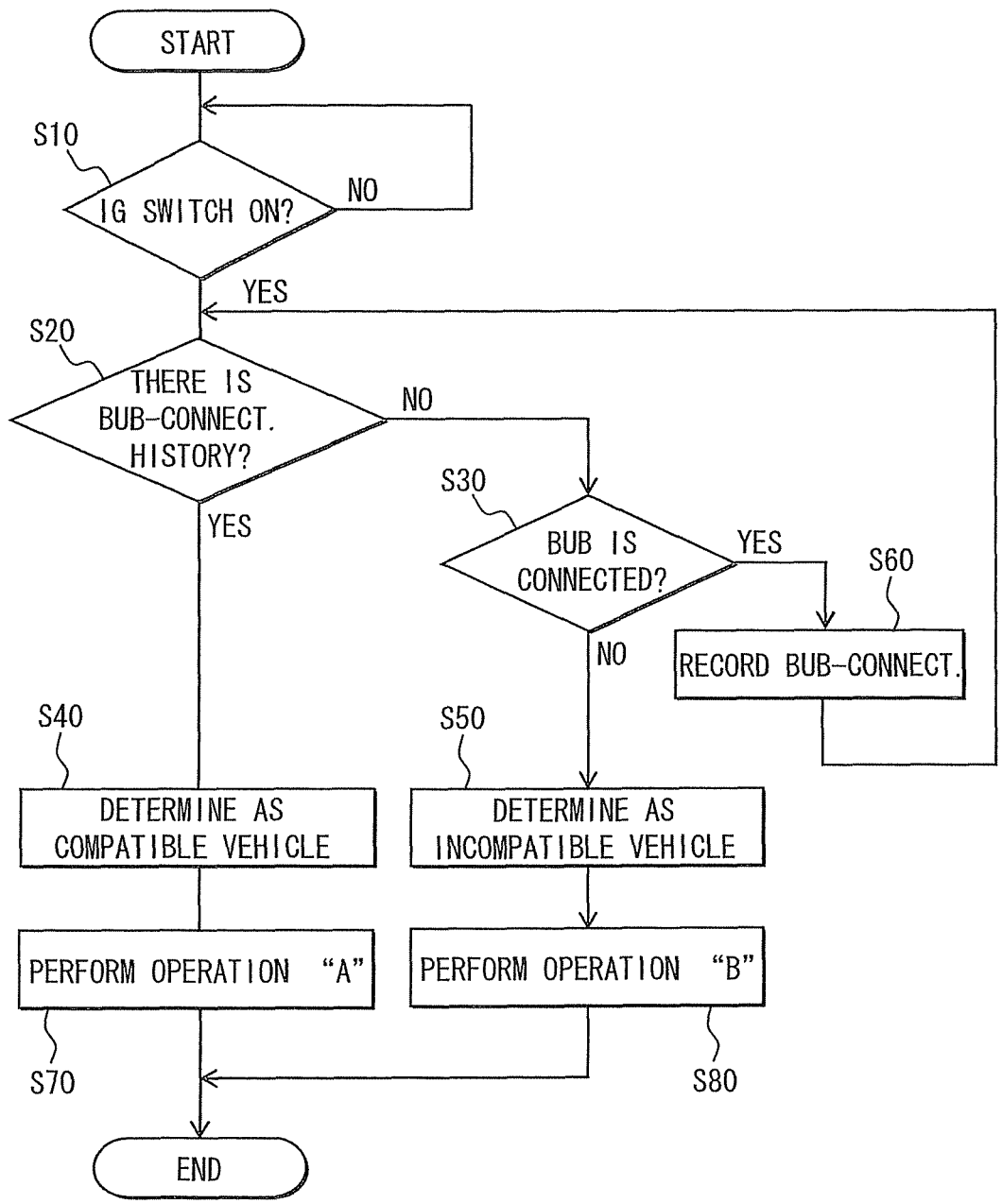
FIG. 4 is a flowchart illustrating processes of a data communication module.

In the processes of FIG. 4, at S10, the CPU 10 determines whether an ON operation of the ignition switch 27 is conducted. In other words, it is determined whether the ignition switch 27 is turned on. When the ignition switch 27 is turned on, corresponding to YES at S10, the process proceeds to S20. When the ignition switch 27 is not turned on, corresponding to NO at S10, S10 is repeated to wait for turning of the ignition switch 27.

At S20, the CPU 10 determines whether there is a history of connection of a buck-up battery (BUB). The history of connection of a BUB is a record that indicates that the BUB was connected (attached) in past. The history of connection of a BUB may be stored in the EEPROM 12. A process of storing the history is performed at S60, which will be described later. When there is the history of connection of a BUB, corresponding to "YES" at S20, the process proceeds to S40. When there is no history of connection of a BUB, corresponding to "NO" at S20, the process proceeds to S30.

At S30, the CPU10 determines whether or not the BUB15*a* is connected (attached). When the BUB15*a* is connected, corresponding to YES at S30, the process proceeds to S60. When the BUB15*a* is not connected, corresponding to NO at S30, the process proceeds to S50. At S60, the CPU 10 stores the record in the EEPROM 12, so that the record indicates that the BUB 15*a* is connected (mounted). After S60, the process returns to S20.

Because of the above-described, processes, when the DCM 1 is mounted to the compatible vehicle 2*a*, the process proceeds to S40 because the BUB 15*a* is attached. When the DCM 1 is mounted to the incompatible vehicle 2*b*, the process proceeds to S50 because the BUB 15*a* is not attached. At S40, the CPU 10 determines that the DCM 1 is mounted to the compatible vehicle 2*a*. At S50, the CPU 10 determines that the DCM 1 is mounted to the incompatible vehicle 2*b*. At S40, a record indicating that the DCM1 is mounted to the compatible vehicle is stored in the EEPROM 12. At S50, a record indicating that the DCM 1 is mounted to the incompatible vehicle may be stored in the EEPROM 12. These records correspond to modes of the DCM 1.

At S70, the CPU 10 performs an operation "A", which is a normal operation when the DCM 1 is mounted to the compatible vehicle 2*a*. At S80, the CPU 10 performs an operation "B", which is a normal operation when the DCM 1 is mounted to the incompatible vehicle 2*a*.

Figure 5:
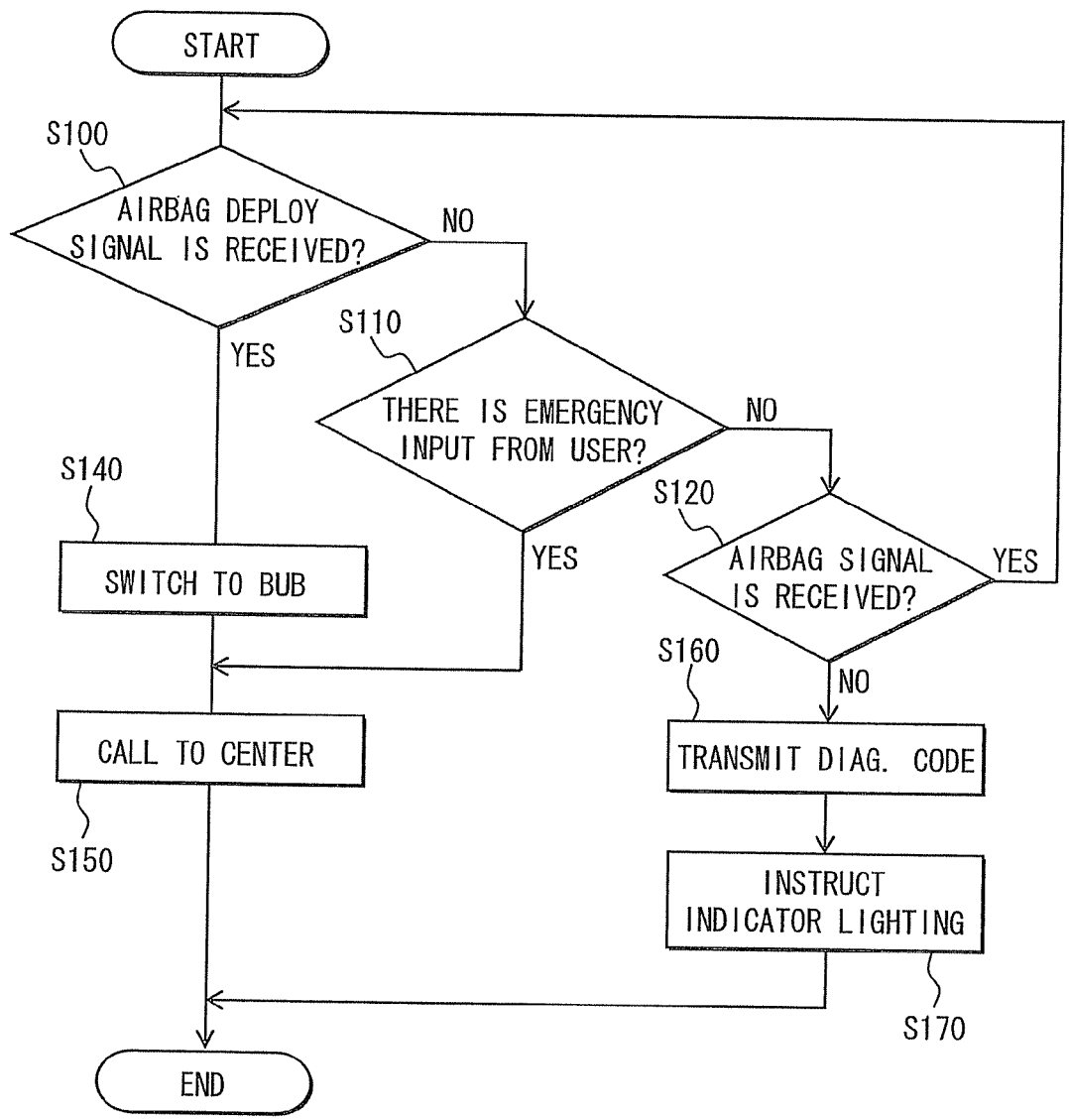
FIG. 5 is a flowchart illustrating an operation of a data communication module when the data communication module is mounted to a vehicle compatible with the airbag-linked emergency call.
Figure 6:
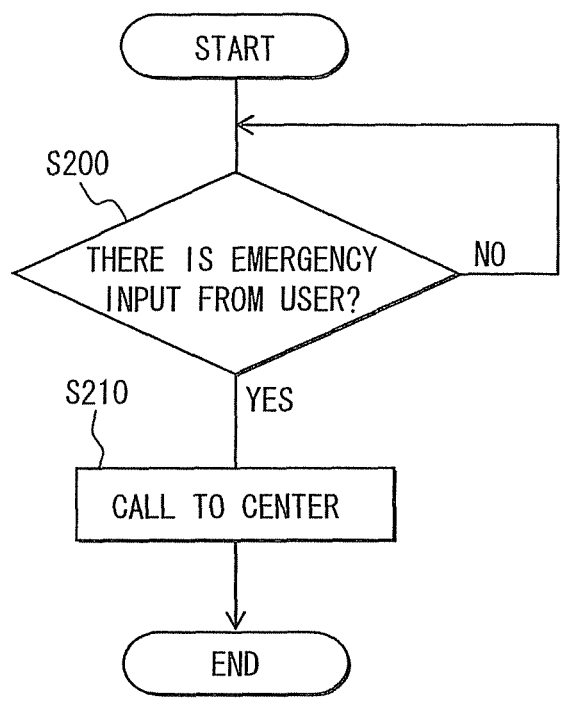
FIG. 6 is a flowchart illustrating an operation of a data communication module when the data communication module is mounted to a vehicle incompatible with the airbag-linked emergency call.

Examples of the operation "A" and the operation "B" are shown in FIGS. 5 and 6, respectively. First, the operation "A" in FIG. 5 will be described. It should be noted that the processes in FIG. 5 include (or may partly include) processes to be performed when the factory tool 40 or the dealer tool 41 are connected to the DCM 1.

As shown in FIG. 5, at S100, the CPU 10 determines whether or not the airbag deploy signal is received. When the airbag deploy signal is received, corresponding to "YES" at S100, the process proceeds to S140. When the airbag deploy signal is not received, corresponding to "NO" at S100, the process proceeds to S110.

At S140, the CPU 10 switches the power supply source, which supplies the electric power to the DCM 1, from the in-vehicle battery 20 to the BUB 15*a*. In this way, when the airbag is deployed, the power supply source is promptly switched to the BUB 15*a*. Thus, even if it becomes impossible to supply the electric power form the in-vehicle battery to the DCM 1, the emergency call can be reliably made by using the electric power of the BUB 15*a*. When S140 is not performed, the in-vehicle battery 20 may supply the electric power to the DCM 1.

At S110, the CPU 10 determines whether there is an input (emergency input) to the emergency call switch 21 from the user. When there is the emergency input from the user, corresponding to "YES" at S110, the process proceeds to S150. When there is no emergency input from the user, corresponding to "NO" at S110, the process proceeds to S120.

At S150, the CPU 10 issues an instruction for making a call to the service center 30. Upon receiving the instruction, the wireless communication device 13 makes a call to the service center 30. Then, with the microphone 23 and the speaker 24, the operator of the service center 30 and the occupant of the vehicle become able to speak with each other. Accordingly, the occupant can inform the operator of a detailed emergency situation by speaking with the operator.

In the above, information about the position (latitude, longitude) of the vehicle 2*a* (or 2*b*) calculated by the GPS positioning device 14 is also transmitted from the wireless communication device 13 to the service center 30. Therefore, even in a situation where the occupant is unconscious, the service center 30 can specify the position of the vehicle and can take appropriate measures such as calling a fire dept. or police closest to the vehicle.

At S120, the CPU 10 does not make an emergency call but performs a process relating to diagnosis (malfunction diagnosis) of the airbag. At S120, the CPU 10 determines whether the airbag signal is received. When the airbag signal is received, corresponding to YES at S120, the process returns to S100. When the airbag signal is not received, corresponding to NO at S120, the process proceeds to S160.

At S160, the CPU 10 transmits a diagnosis code, which is a code indicating that the airbag is malfunctioned. This process may include transmitting the diagnosis code to the factory tool 40 or the dealer tool 41 when the factory tool 40 or the dealer tool 41 is connected to the tool controller 17. When neither of the factory tool 40 and the dealer tool 41 is connected to the tool controller 17, the CPU 10 may skip S160.

At S170, the CPU 10 issues an instruction for lighting the indicator 22. Because of this, the occupant of the vehicle recognizes a possibility that the airbag is malfunctioned. The occupant can take appropriate measures such as sending the vehicle to repair or the like.

Next, the operation B illustrated in FIG. 6 will be illustrated. As described above, since neither the airbag signal nor the airbag deployment signal is outputted from the airbag system 25*b* of the incompatible vehicle 2*b*, a procedure of processes in FIG. 6 is different from that in FIG. 5. In the processes in FIG. 6, the emergency call linked with the deployment of the airbag does not exist, and the diagnosis operation using the airbag signal does not exist.

As shown in FIG. 6, at S200, the CPU 10 determines whether there is an input (emergency input) to the emergency call switch 21 from the user. When there is the emergency input from the user, corresponding to YES at S200, the process proceeds to S210. When there is no emergency input from the user, corresponding to "NO" at S200, S200 is repeated to wait for the emergency input.

At S210, the CPU 10 makes a call to the service center 30. S210 is similar to S150. In the processes of FIG. 6, the in-vehicle battery 20 supplies the electric power to the DCM 1.

The DCM 1 may be configured as follows. When the factory tool 40 or the dealer tool 41 is operated in a state where the factory tool 40 or the dealer tool 41 is connected to the tool controller 17, a mode of the DCM 1 can be changed. In the above, the mode can be changed between a first mode and a second mode. The first mode is mode where the DCM performs the above-described operation "A" when the DCM is mounted to the compatible vehicle. The second mode is a mode where the DCM performs the above-described operation B when the DCM is mounted to the incompatible vehicle.

Because of the above, even after the mode of the DCM 1 is fixed, the mode can be changed. Therefore, flexibility is improved.

The above embodiment can be modified in various ways. For example, the processes in FIGS. 4 and 5 are merely examples of operations of the DCM 1, and can be modified according to needs. For example, the DCM 1 may acquire or download various information such as traffic information and the like from the service center 30 or websites on Internet during non-deployment of the airbag, and may display the information on the display device of the navigation system 26.

In a case of vehicle theft, the DCM 1 may perform the following. In respond to communications from the service center 30 to the DCM 1, the DCM 1 transmits the positional information of the vehicle to the service center 30. In this way, it is possible to easily acquire the location of the stolen vehicle.

In the above embodiment, the receiver device 16*a* can correspond to a receiver section or means. The CPU 10 and S120 can correspond to an abnormality determination section or means. The CPU 10, S20 and S30 can correspond to a control section or means. The power supply device 15 can correspond to a battery attachment section or means. The CPU 10, S20 and S30 can correspond to a detection section or means. The CPU 10, S40 and S50 can correspond to a mounting determination section or means. The wireless communication device 13 can correspond to a communication section or means. The CPU 10 and S140 can correspond to a power control section or means. The airbag system 25*a*, 25*b* can correspond to an airbag apparatus. The service center 30 can correspond to an external apparatus external to vehicles.

According to an example of the present disclosure, a control apparatus for vehicles including a first vehicle and a second vehicle each equipped with an airbag apparatus can be configured as follows. A transmission section for transmitting an airbag signal from the airbag apparatus during non-deployment of the airbag apparatus is equipped in the first vehicle and is not equipped in the second vehicle. The control apparatus includes: a receiver section for receiving a signal (e.g., airbag signal) transmitted from the airbag apparatus; an abnormality determination section for determining that the airbag apparatus is abnormal when the receiver section does not receive the signal transmitted from the airbag apparatus; and a control section for activating the abnormality determination section when the control apparatus is mounted to the first vehicle, and for deactivating the abnormality determination section when the control apparatus is mounted to the second vehicle.

According to the above configuration, the control apparatus is mountable to both of the first vehicle, which is equipped with the airbag apparatus configured to output the airbag signal, and the second vehicle, which is equipped with the airbag apparatus configured not to output the airbag signal. When the control apparatus is mounted to the first vehicle, the control apparatus can determine whether the airbag apparatus is malfunctioned, based on a presence and absence of the airbag signal. When the control apparatus is mounted to the second vehicle, the control apparatus does not make a determination as to malfunction of the airbag apparatus. When the above control apparatus is mounted the second vehicle, the control apparatus does not receive the signal. Thus, a problem that the airbag apparatus is wrongly determined as being malfunctioned does not occur in the above control apparatus, unlike a conventional apparatus. Therefore, the control apparatus can change operation depending on whether the control apparatus is mounted to the first vehicle or the second vehicle, so that only when being mounted the first vehicle, the control apparatus can perform an airbag malfunction diagnosis. Therefore, a same control apparatus (the control apparatus having a same part number) is mountable to both of the first vehicle and the second vehicle. Simplification of production processes is achievable.

The above control apparatus may be configured to further include: a battery attachment section for attaching a battery thereto, wherein the battery to be attached to the battery attachment section is other than an in-vehicle battery; a detection section for detecting whether the battery is attached to the battery attachment section; and a mounting determination section. The mounting determination section determines that the control apparatus is mounted to the first vehicle when the detection section detects that the battery is attached to the battery attachment section. The mounting determination section determines that the control apparatus is mounted to the second vehicle when the detection section detects that the battery is not attached to the battery attachment section.

According to the above configuration, depending on whether the battery other than the in-vehicle battery is attached, it is determined whether the control apparatus is mounted to the first vehicle or the second vehicle. Therefore, it is possible to determine a vehicle in a simple manner. Only in the case of the first vehicle, the control apparatus can perform a airbag diagnosis operation. By using a determination manner based on attachment of the battery, it is possible to mount the same control apparatus (the same production number) to each of the first vehicle and the second vehicle. It is possible to achieve high efficiency in mounting works and reduction in the number of parts.

The above control apparatus may be configured to further include: a communication section for performing wireless communication with an external communication device external to each of the first vehicle and the second vehicle when the receiver section receives an airbag deployment signal, which is other than the airbag signal and which is transmitted from the transmission section of the first vehicle when the airbag apparatus is deployed.

According to the above configuration, when the control apparatus is mounted to the first vehicle, the communication section performs the wireless communication with the external communication device in response to the airbag deployment. Thus, the control apparatus controls an airbag-linked emergency call at a vehicle collision or the like. Therefore, the same control apparatus can achieve the following: when the control apparatus is mounted to the first vehicle, the control apparatus make the airbag-linked emergency call and perform a control process of diagnosing airbag malfunction; when the control apparatus is mounted to the second vehicle, the control apparatus does not wrongly diagnose the airbag as abnormal.

Alternatively, the above control apparatus may be configured as follows. The control apparatus further includes a battery attachment section for attaching a battery thereto. The battery to be attached is other than an in-vehicle battery. The control section includes: a detection section and a mounting determination section. The detection section detects whether the battery is attached to the battery attachment section. The mounting determination section determines that the control apparatus is mounted to the first vehicle when the detection section detects that the battery is attached to the battery attachment section. The mounting determination section determines that the control apparatus is mounted to the second vehicle when the detection section detects that the battery is not attached to the battery attachment section. The transmission section of the first vehicle transmits an airbag deployment signal other than the airbag signal when the airbag apparatus is deployed. Moreover, the control apparatus further includes: a communication section for communicating with an external communication device external to each of the first vehicle and the second vehicle when the receiver section receives the airbag deployment signal; and a power control section for supplying the communication section with electric power stored in the battery attached to the battery attachment section when the control apparatus is mounted to the first vehicle and the airbag apparatus is deployed.

According to the configuration, when the control apparatus is mounted to the first vehicle, the electric power of the battery attached to the battery attachment section is supplied to the communication section in response to the deployment of the airbag apparatus. From the existence and non-existence of the attached battery, the vehicle to which the control apparatus is mounted is determined. When being mounted to the first vehicle, the control apparatus makes the emergency call by using the electric power of the attached battery. Therefore, it is possible to provide the control apparatus that can determine a vehicle based on the attachment and non-attachment of the battery and can make an emergency call using the electric power of the attached battery. It is possible to achieve the control apparatus that is capable of being mounted to both of the first vehicle and the second vehicle, and that is capable of effectively use a battery.

The above control apparatus may be configured as follows. Each time an ON operation of a vehicle ignition switch is conducted, the control section determines whether the control apparatus is mounted to the first vehicle or the second vehicle.

According to the above configuration, it is possible to achieve the control apparatus that can reliably determine whether the control apparatus is mounted to the first vehicle or the second vehicle, and that can change its operation according to a vehicle to which the control apparatus is mounted.

While the invention has been described above with reference to various embodiments thereof, it is to be understood that the invention is not limited to the above described embodiments and constructions. The invention is intended to cover various modifications and equivalent arrangements.

What is claimed is:

1. A control apparatus for a first vehicle and a second vehicle, the control apparatus comprising:
   a receiver section for receiving an airbag signal transmitted from an airbag apparatus, wherein the airbag apparatus is equipped in each of the first vehicle and the second vehicle, wherein a transmission section for transmitting the airbag signal from the airbag apparatus during non-deployment of the airbag apparatus is equipped in the first vehicle but is not equipped in the second vehicle;
   an abnormality determination section for determining that the airbag apparatus is abnormal when the airbag signal transmitted from the airbag apparatus is not received by the receiver section;
   a control section for
      activating the abnormality determination section when the control apparatus is mounted to the first vehicle, and
      prohibiting activation of the abnormality determination section when the control apparatus is mounted to the second vehicle; and
   a battery attachment section to which a battery other than an in-vehicle battery is to be attached,
   wherein the control section includes:
      a detection section for detecting whether the battery is attached to the battery attachment section; and
      a mounting determination section for determining that the control apparatus is mounted to the first vehicle when the detection section detects that the battery is attached to the battery attachment section, and for determining that the control apparatus is mounted to the second vehicle when the detection section detects that the battery is not attached to the battery attachment section.

2. The control apparatus according to claim 1, wherein upon deployment of the airbag apparatus, the transmission section of the first vehicle transmits an airbag deployment signal other than the airbag signal, the control apparatus further comprising:
   a communication section for performing wireless communication with an external communication device external to the first vehicle when the receiver section receives the airbag deployment signal.

3. A control apparatus for a first vehicle and a second vehicle, the control apparatus comprising:
   a receiver section for receiving an airbag signal transmitted from an airbag apparatus, wherein the airbag apparatus is equipped in each of the first vehicle and the second vehicle, wherein a transmission section for transmitting the airbag signal from the airbag apparatus during non-deployment of the airbag apparatus is equipped in the first vehicle but is not equipped in the second vehicle;
   an abnormality determination section for determining that the airbag apparatus is abnormal when the airbag signal transmitted from the airbag apparatus is not received by the receiver section;
   a control section for
      activating the abnormality determination section when the control apparatus is mounted to the first vehicle, and
      prohibiting activation of the abnormality determination section when the control apparatus is mounted to the second vehicle; and
   a battery attachment section to which a battery other than an in-vehicle battery is to be attached,
   wherein the control section includes:
      a detection section for detecting whether the battery is attached to the battery attachment section; and
      a mounting determination section for determining that the control apparatus is mounted to the first vehicle when the detection section detects that the battery is attached to the battery attachment section, and for determining that the control apparatus is mounted to the second vehicle when the detection section detects that the battery is not attached to the battery attachment section,
   wherein upon deployment of the airbag apparatus, the transmission section of the first vehicle transmits an airbag deployment signal other than the airbag signal,
   the control apparatus further comprising:
   a communication section for communicating with an external communication device external to the first vehicle when the receiver section receives the airbag deployment signal; and
   a power control section for, upon the deployment of the airbag apparatus, supplying the communication section with electric power stored in the battery attached to the battery attachment section when the control apparatus is mounted to the first vehicle.

4. The control apparatus according to claim 1, wherein:
each time an ON operation of a vehicle ignition switch is conducted, the control section determines whether the control apparatus is mounted to the first vehicle or the second vehicle.

* * * * *